United States Patent
Hoehne et al.

(10) Patent No.: US 9,426,073 B2
(45) Date of Patent: Aug. 23, 2016

(54) DATA TRANSMISSION MECHANISM WIT+H IMPROVED ROBUSTNESS USING MULTIFLOW CONNECTION

(71) Applicant: Nokia Solutions and Networks Oy, Espoo (FI)

(72) Inventors: Hans Thomas Hoehne, Helsinki (FI); Petri Antero Jolma, Nurmijarvi (FI); Jani Matti Johannes Moilanen, Helsinki (FI); Karri Markus Ranta-Aho, Espoo (FI); Alexander Sayenko, Espoo (FI); Jeroen Wigard, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/386,146

(22) PCT Filed: Feb. 8, 2013

(86) PCT No.: PCT/EP2013/052497
§ 371 (c)(1),
(2) Date: Sep. 18, 2014

(87) PCT Pub. No.: WO2013/139524
PCT Pub. Date: Sep. 26, 2013

(65) Prior Publication Data
US 2015/0085657 A1   Mar. 26, 2015

(30) Foreign Application Priority Data

Mar. 19, 2012  (WO) ............... PCT/EP2012/054836

(51) Int. Cl.
*H04L 12/801* (2013.01)
*H04W 40/12* (2009.01)
*H04L 12/725* (2013.01)
(Continued)

(52) U.S. Cl.
CPC ............... *H04L 47/12* (2013.01); *H04L 45/22* (2013.01); *H04L 45/24* (2013.01); *H04L 45/306* (2013.01); *H04W 40/12* (2013.01); *H04L 45/70* (2013.01)

(58) Field of Classification Search
None
See application file for complete search history.

(56) References Cited

U.S. PATENT DOCUMENTS 6,738,352 B1 * 5/2004 Yamada ............. H04L 45/00
370/238
7,327,671 B2 * 2/2008 Karino ............. H04L 12/185
370/219

(Continued)

FOREIGN PATENT DOCUMENTS

WO   WO 2004/068739 A1   8/2004

OTHER PUBLICATIONS

3GPP TSG-RAN WG1 Meeting #68, Dresden, Germany, Feb. 6-10, 2012, R1-120655, "Multiflow CQI reporting formats", Nokia Siemens Networks, 5 pgs.

(Continued)

*Primary Examiner* — Hong Cho
(74) *Attorney, Agent, or Firm* — Harrington & Smith

(57) ABSTRACT

There is provided a mechanism for conducting data transmission from a network management entity of communication network control element to a terminal or UE with improved robustness. After a multiflow connection for data units via at least one network transceiver device and via at least two different paths is set up towards a terminal, selection criteria are applied so as to decide which data units are sent on which transmission path. Specifically, dependent on the applied selection criteria, data units of specific data are selected to be subjected either to bicasting each selected data unit using the at least two paths, or to dynamic flow switching so as to transmit each selected data unit using one of the at least two paths and wherein each selected data unit can be independently chosen to be transmitted over either of the at least two paths.

17 Claims, 13 Drawing Sheets

(51) Int. Cl.
*H04L 12/707* (2013.01)
*H04L 12/721* (2013.01)

(56) References Cited

U.S. PATENT DOCUMENTS

| | | | |
|---|---|---|---|
| 7,583,601 B2* | 9/2009 | Yasukawa | H04L 45/12 370/238 |
| 2007/0177594 A1* | 8/2007 | Kompella | H04L 12/185 370/390 |
| 2009/0252134 A1* | 10/2009 | Schlicht | H04L 1/0015 370/338 |
| 2013/0223275 A1* | 8/2013 | Vasseur | H04L 45/26 370/254 |

OTHER PUBLICATIONS

3GPP TSG-RAN WG2 Meeting #77bis, Jeju, South Korea, Mar. 26-30, 2012, R1-121155, "SRB with Multiflow HSDPA", Nokia Siemens Networks, 5 pgs.

3GPP TSG-RAN WG2 Meeting #78, Prague, Czech Republic, May 21-25, 2012, R2-122151, "Signaling radio bearers with Multiflow HSDPA", Nokia Siemens Networks, 4 pgs.

3GPP TR 25.872 V11.0.0 (Sep. 2011), "$3^{rd}$ Generation Partnership Project; Technical Specification Group Radio Access Network; High Speed Packet Access (HSDPA) multipoint transmission (Release 11)", 29 pgs.

* cited by examiner

DATA TRANSMISSION MECHANISM WITH IMPROVED ROBUSTNESS USING MULTIFLOW CONNECTION

BACKGROUND OF THE INVENTION

1. Field of the Invention

The present invention relates to a mechanism for conducting data transmission from a network management entity or a communication network control element to a terminal or UE with improved robustness. Specifically, the present invention is related to an apparatus, a method and a computer program product which provide a communication mechanism in which an improved robustness of data communication can be achieved by using a multiflow connection between a network and a terminal.

2. Related Background Art

Prior art which is related to this technical field can e.g. be found in technical specifications according to 3GPP TS 25.308 (e.g. version 11.0.0), 3GPP TS 25.322 (e.g. version 10.1.0), and 3GPP TS 25.331 (e.g. version 11.0.0).

The following meanings for the abbreviations used in this specification apply:
AM: acknowledged mode
ARQ: automatic repeat request
BS: base station
CPC: continuous packet connectivity
CQI: channel quality indicator
DL: downlink
eSCC: enhanced SCC
F-DPCH: fractional dedicated physical channel
HARQ: hybrid ARQ
HS-DSCH: high speed downlink shared channel
HSPA: high speed packet access
LTE: Long Term Evolution
LTE-A: LTE Advanced
MAC: medium access control
MBMS: multimedia broadcast and multicast services
MF: multiflow
PDCP: packet data layer convergence protocol
PDU: protocol data unit
RLC: radio link control
RNC: radio network controller
RRC: radio resource controller
RSSI: received signal strength indicator
SCC: serving cell change
SGSN: serving GPRS support node
SHO: soft handover
SINR: signal to interference plus noise ratio
SRB: signalling radio bearer
Tr, TM: transparent mode
TX: transmission
UE: user equipment
UL: uplink
UM: unacknowledged mode
VoIP: voice over IP In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between communication elements or terminals such as a user equipment (UE) and another communication element, terminal or user equipment, a database, a server, etc., one or more intermediate network elements such as communication network control elements, network management entities, support nodes or service nodes are involved which may belong to different communication network.

For achieving a more efficient way for using network resources, multi-point transmission schemes are employed. For example, in 3GPP based networks according to release 11, for example, HSDPA multiflow transmission is under discussion where users (UEs) being on a cell edge are provided with improved data rates by receiving transmissions also from neighbouring cells.

For example, at a cell edge, where also multiflow operates, UEs may occasionally experience very poor radio performance. For best effort traffic this may not be that much of a problem and one option for overcoming this is to maximize the average data rates. In case of multiflow this means that a UE receives independent data streams from multiple cells simultaneously, and (HARQ/ARQ) retransmission mechanisms are used to take care of any lost packets.

However, there are also situations where such an approach of using higher data rates is not beneficial and may even be harmful. Furthermore, higher data rates are not always preferred, but better robustness and lower latency may be desired. Examples of such situations may be communications comprising traffic types like VoIP, interactive games, or certain RRC control messages. For this type of traffic the conventional multiflow transmission where data is routed to the UE over separate network elements such as separate cells under certain circumstances does not offer any improvements. In fact it may even lead to worse performance since traffic possibly gets more often transmitted over a weaker link. It is to be noted that multiflow typically leads to higher throughput, and therefore lower latency, by virtue of having the possibility of using two links in parallel. However, a worse performance may happen for very short messages which run over only one link, in case the link happens to be the weaker link.

SUMMARY OF THE INVENTION

It is an object of the invention to provide an improved mechanism for conducting data transmission between a network management entity of communication network control element and a terminal or UE with higher robustness. Specifically, it is an object of the present invention to provide apparatuses, methods and a corresponding computer program product which allow to conduct an improved communication mechanism with higher robustness for specific data using a multiflow connection between the network and the terminal.

These objects are achieved by the measures defined in the attached claims.

According to an example of an embodiment of the proposed solution, there is provided, for example, an apparatus comprising a control module configured to set up a multiflow connection for data units via at least one network transceiver device and via at least two different paths towards a terminal, and, apply selection criteria, and dependent on the applied selection criteria, select data units of specific data, to be subjected to bicasting each selected data unit using the at least two paths, or to dynamic flow switching so as to transmit each selected data unit using one of the at least two paths and wherein each selected data unit can be independently chosen to be transmitted over either of the at least two paths.

Furthermore, according to an example of an embodiment of the proposed solution, there is provided, for example, a method comprising setting up a multiflow connection for data units via at least one network transceiver device and via at least two different paths towards a terminal, and, applying selection criteria, and dependent on the applied selection criteria, selecting data units of specific data, to be subjected to bicasting each selected data unit using the at least two paths, or to dynamic flow switching so as to transmit each selected data unit using one of the at least two paths and wherein each selected data unit can be independently chosen to be transmitted over either of the at least two paths.

According to further refinements, these examples may comprise one or more of the following features:

- the data units may be of a control plane data type or of a user plane data type;
- the paths may be set up as distinct logical channels, wherein the distinct logical channels may be further set up on distinct physical channels;
- as selection criteria, at least a radio link reliability measure indicative of the radio link reliability towards the terminal may be applied;
- then, the radio link reliability measure may comprise at least one of an estimate of packet error rate, latency, or signal quality;
- the selection criteria applied may be configured to be distinct for different data types;
- at least some of the selection criteria may be received as reports from a terminal and/or at least some of the selection criteria may be obtained based on statistic evaluation;
- the selection criteria my be requested from the at least one network transceiver device;
- the selection criteria may be requested from the at least one network transceiver device selectively for at least specified data types and/or specified traffic types;
- the selection criteria may be requested with a configurable request interval and/or based on the detected occurrence of configurable reporting events;
- it may be decided on one of the at least two paths to be used in dynamic flow switching for the selected data unit based on the selection criteria.

Moreover, according to an example of an embodiment of the proposed solution, there is provided, for example, an apparatus comprising a control module configured to receive a multiflow connection for data units via at last one network transceiver device and via at least two different paths from a network control entity, and, receive selected data units of specific data, that were subjected to bicasting, wherein each selected data unit is received using the at least two paths, or subjected to dynamic flow switching, wherein each selected data unit is received using one of the at least two paths and wherein each selected data unit is independently received over either of the at least two paths.

In addition, according to an example of an embodiment of the proposed solution, there is provided, for example, a method comprising receiving a multiflow connection for data units via at last one network transceiver device and via at least two different paths from a network control entity, and, receiving selected data units of specific data, that were subjected to bicasting, wherein each selected data unit is received using the at least two paths, or subjected to dynamic flow switching, wherein each selected data unit is received using one of the at least two paths and wherein each selected data unit is independently received over either of the at least two paths.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a mechanism by means of which multiflow connections can be used for improving reliability and robustness of data transmission by using intelligent flow switching and/or bicasting. Specifically, the present invention provides a mechanism conducting a data transmission between a network and a terminal wherein robustness of the data communication can be improved achieved by using a bicasting in a multiflow connection between the network and the terminal. For example, bicasting can improve the reliability especially during link changes and mobility, but the reliability for messages (critical data) can be generally increased. Furthermore, by providing means to smartly choose what data are to be transmitted by using bicasting or are to be transmitted by a dynamic flow switching using the multiflow connection, it is possible to transmit data in a more efficient manner, wherein a terminal can receive simultaneously messages over more than one link in the multiflow connection. In addition, by using a suitable reliability measure for deciding which transmission type (bicasting/dynamic flow switching) is used on which data, an efficient and reliable transmission of critical data can be achieved ensuring, for example, that traffic or data types that benefit from the improved robustness provided e.g. by bicasting are selected accordingly. On the other hand, the reliability measure can be used to select a proper data link of the multiflow connection when using dynamic flow switching, for example, which also improves the reliability of the transmission of data.

The above and still further objects, features and advantages of the invention will become more apparent upon referring to the description and the accompanying drawings.

DESCRIPTION OF PREFERRED EMBODIMENTS

Figure 1:
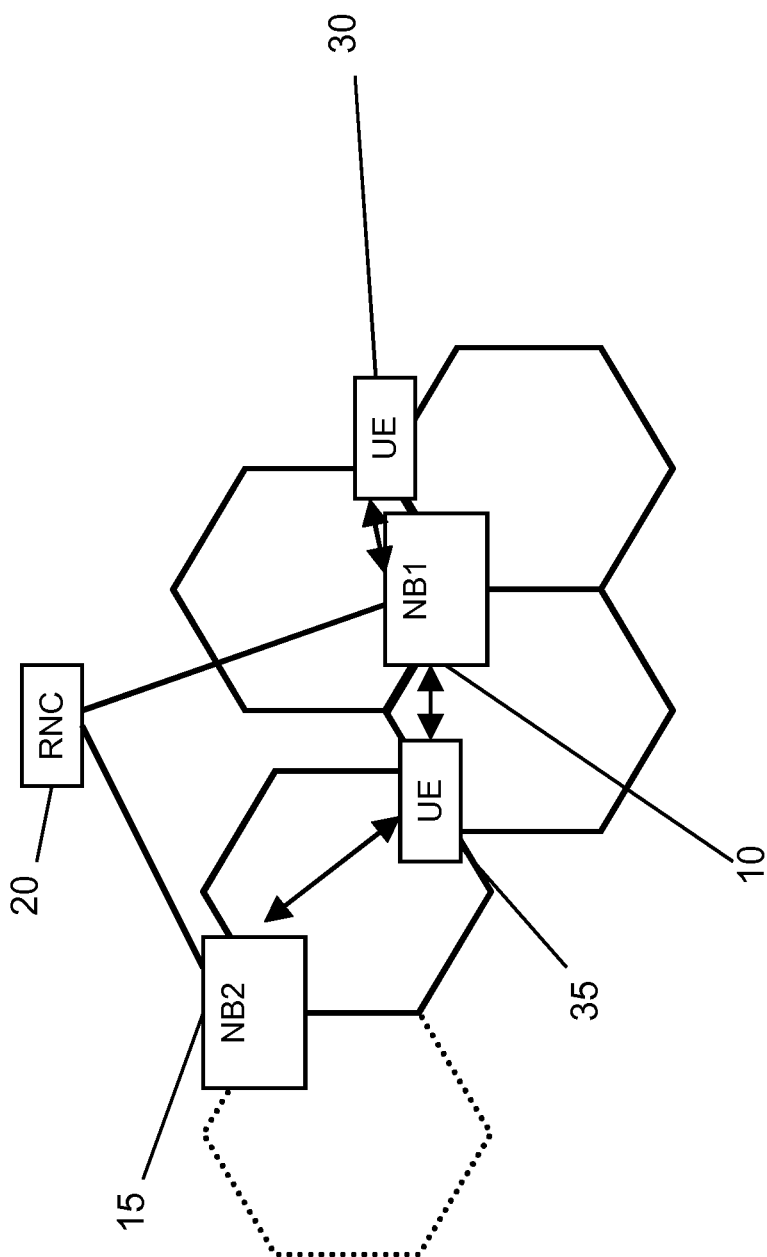
FIG. 1 shows a diagram illustrating a communication network configuration where examples of embodiments of the invention are implemented.

In the following, examples and embodiments of the present invention are described with reference to the drawings. For illustrating the present invention, the examples and embodiments will be described in connection with a cellular communication network based on a 3GPP communication system. However, it is to be noted that the present invention is not limited to an application using such types of communication system, but is also applicable in other types of communication systems and the like.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station (BS) or node B (NB), which control a coverage area having one or more cells and with which one or more communication elements or terminal devices such as a UE or another device having a similar function, such as a modem chipset, a chip, a module etc., which can also be part of a UE or attached as a separate element to a UE, or the like, are capable to communicate via one or more links or channels for transmitting several types of data. Furthermore, core network elements such as radio network controllers, gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a terminal or communication element like a UE or a network management entity or communication network control element like an RNC or NB, besides those described in detail herein below.

Furthermore, the described network elements, such as terminals or communication elements like UEs, or network management entities or communication network control elements like RNCs or NBs and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram is depicted illustrating a general configuration of a communication network where examples of embodiments of the invention are implemented. It is to be noted that the configuration shown in FIG. 1 shows only those devices, network elements and parts which are useful for understanding principles underlying the examples of embodiments of the invention. As also known by those skilled in the art there may be several other network elements or devices involved in a connection between the terminal communication elements (UEs) and the network which are omitted here for the sake of simplicity.

In FIG. 1, a communication network configuration is illustrated in which examples of embodiments of the invention are implementable. The network according to FIG. 1 is for example based on 3GPP specifications. It is to be noted that the general functions of the elements described in connection with FIG. 1 as well as of reference points/ interfaces therebetween are known to those skilled in the art so that a detailed description thereof is omitted here for the sake of simplicity.

As shown in FIG. 1, in the exemplary communication network, a communication network control element controlling a respective communication area is provided in the form of NB1 and NB2 indicated by reference signs 10 and 15, respectively. Each of the NBs controls one or more cells (indicated in FIG. 1 by hexagons), in which a terminal or communication element such as UE 30 or 35 may be located. It is to be noted that the UE 30 is assumed in the following to be located at a cell edge between cells of NB 10 (so called intra-cell case since the same NB is responsible for both areas or cells), while UE 35 is assumed to be located at an edge between a cell or NB1 10 and a cell of NB2 15 (so called inter-cell case since different NBs are responsible for the respective area or cell). Thus, UE 10 communicates via NB1 10 only, and UE 15 communicates via NB1 10 and NB2 15 with the network. Furthermore, a radio network control device or RNC 20 is provided which controls one or more NBs (here, NB1 10 and NB2 15).

It is to be noted that the NB1 and NB2 may function in the following as a network transceiver device (in case a control process according to examples of the invention is conducted in the RNC 20 functioning as the network management entity; according to inter-cell case described below), or as a network management entity (in case a control process according to examples of the invention is conducted in the NBs; according to intra-cell case described below).

It is to be noted that according to examples of embodiments of the invention the elements depicted in FIG. 1 are assumed to be capable of participating in a multiflow connection.

In the following, the term "bicasting" is used for a process where data transmission is conducted such that the data are duplicated when sending them over two links in parallel. On the other hand, multiflow (MF) is related to a process where distinct data are distributed over two links for a transmission (i.e. data throughput is increased). In other words, bicasting is meant to reduce breaks in the connection to an minimum, whereas multiflow is intended to make use of free resources (e.g. in a neighbour cell) for high volume transmissions (however without explicitly reducing latencies). It is to be noted that in the following "bicasting" is used to describe that two different paths are used for transmitting data in parallel. However, the same principal is also applicable when using more than two paths (i.e. "tricasting" or "quadcasting" etc.), but for the sake of simplicity this process is referred to as bicasting in the following description.

Bicasting is also specified for RLC [e.g. 3GPP TS 25.322 sections 11.3.4.8, 11.3.4.2 and 9.7.10], where the RLC-bicasted packets originate in RNC, and are terminated in the UE. However, conventionally, bicasting does not mean that the terminal or UE is receiving in parallel. This is illustrated, for example, in FIG. 2.

Figure 2:
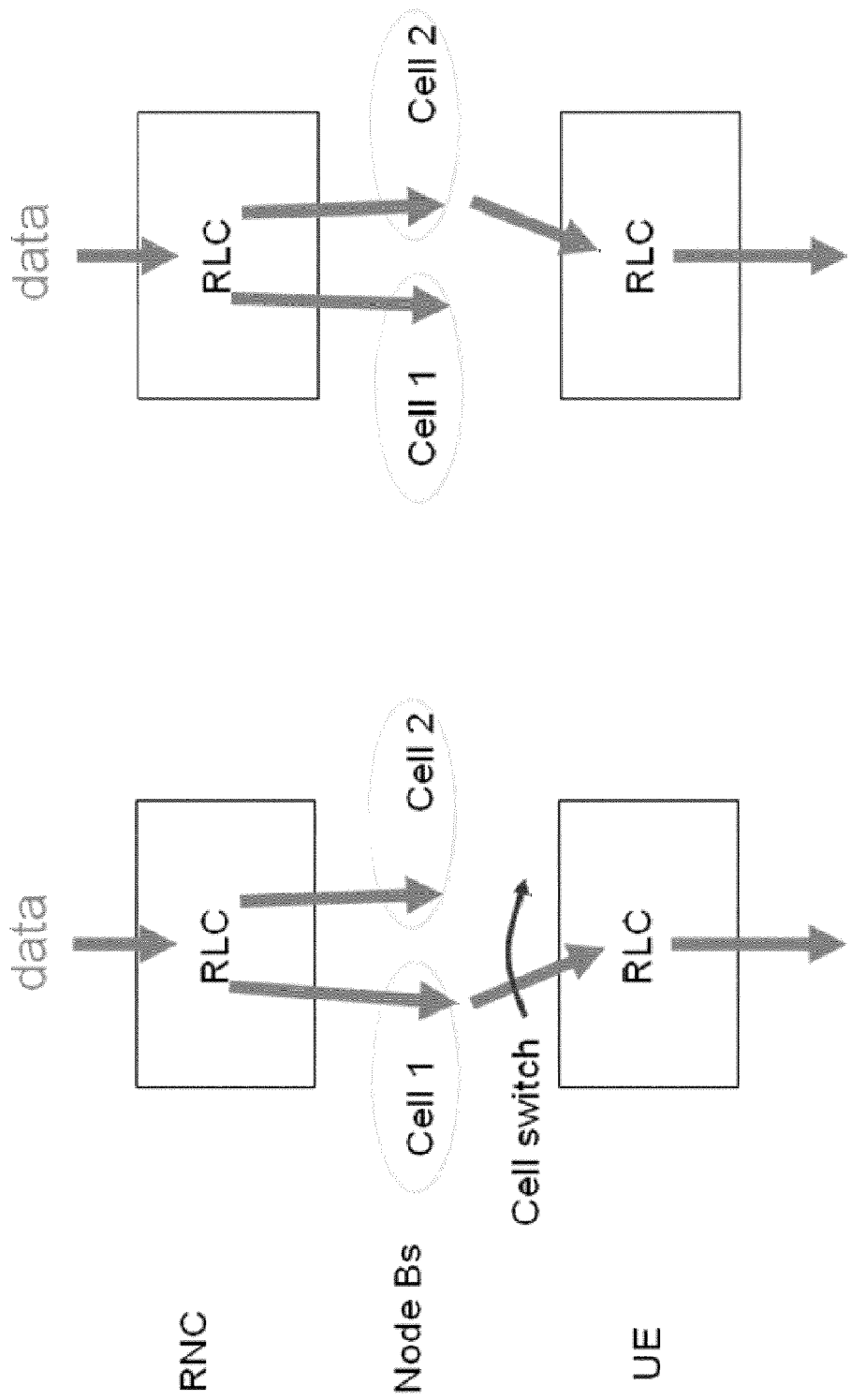
FIG. 2 shows a diagram illustrating a comparative example of a signaling flow in a bicasting procedure of elements shown in FIG. 1.

FIG. 2 shows a diagram illustrating a comparative example of a signaling flow in a bicasting procedure of elements as those shown in FIG. 1 when a conventional processing is conducted.

When data are to be sent using bicasting from an RLC part of the RNC, for example during a serving cell change, it may use, for example, a first path via NB1 10 (cell 1) and another path via NB2 15 (cell 2), if e.g. UE 35 is the destination (usage of data paths is indicated by arrows in the figures). The UE 35, however, is only able to attempt reception of only one of the transmissions at a time. When a cell switch is to be conducted, leading to the situation shown in the right part of FIG. 2, reception of the data via the other transmission via cell 2 is possible. However, there is no guarantee that the UE 35 receives the data from the stronger link.

It has been considered by the inventors of the present invention that one possibility to improve the robustness is, for example, to exploit multiflow to either bicast the more critical data over multiple cells and/or introduce some flow switching which attempts to transmit always on the more reliable link. In this case, however, it is to be noted that e.g. for inter-site multiflow approaches packets are steered by the RNC to specific cells, wherein it is necessary to gain knowledge of a link reliability of the specific cells. Therefore, mechanisms are required to allow the RNC to decide which link it should use or when to apply bicasting, in particular in case high robustness is tried to achieved while at the same time overheads are to be kept small.

One possible example for applying the above principle is to extend bicasting and multiflow (MF) for signalling radio bearer SRB transmission. For example, this is applicable in case the SRB is configured to use HSDPA and the terminal (UE) is in CELL_DCH (RRC state machine state, i.e. dedicated channel state). It is to be noted that RLC PDU sequence numbers have to be available for MF to work, allowing RLC-AM or RLC-UM to be used. A list of different types of SRBs is given below:

SRB0: CCCH with RLC-TM in UL & RLC-UM in DL (e.g. RRCconnectionRequest & Cell/URAupdate in UL & RRCconnectionSetup/Reject in DL)

SRB1: DCCH with RLC-UM (e.g. ciphered CellUpdate-Confirm)

SRB2: DCCH with RLC-AM (a majority of the RRC messages is using SRB2)

SRB3: DCCH with RLC-AM (NAS messages=Network Access Stratum messages)

SRB4: DCCH with RLC-AM (optional SRB for low priority NAS messages)

Figure 3:
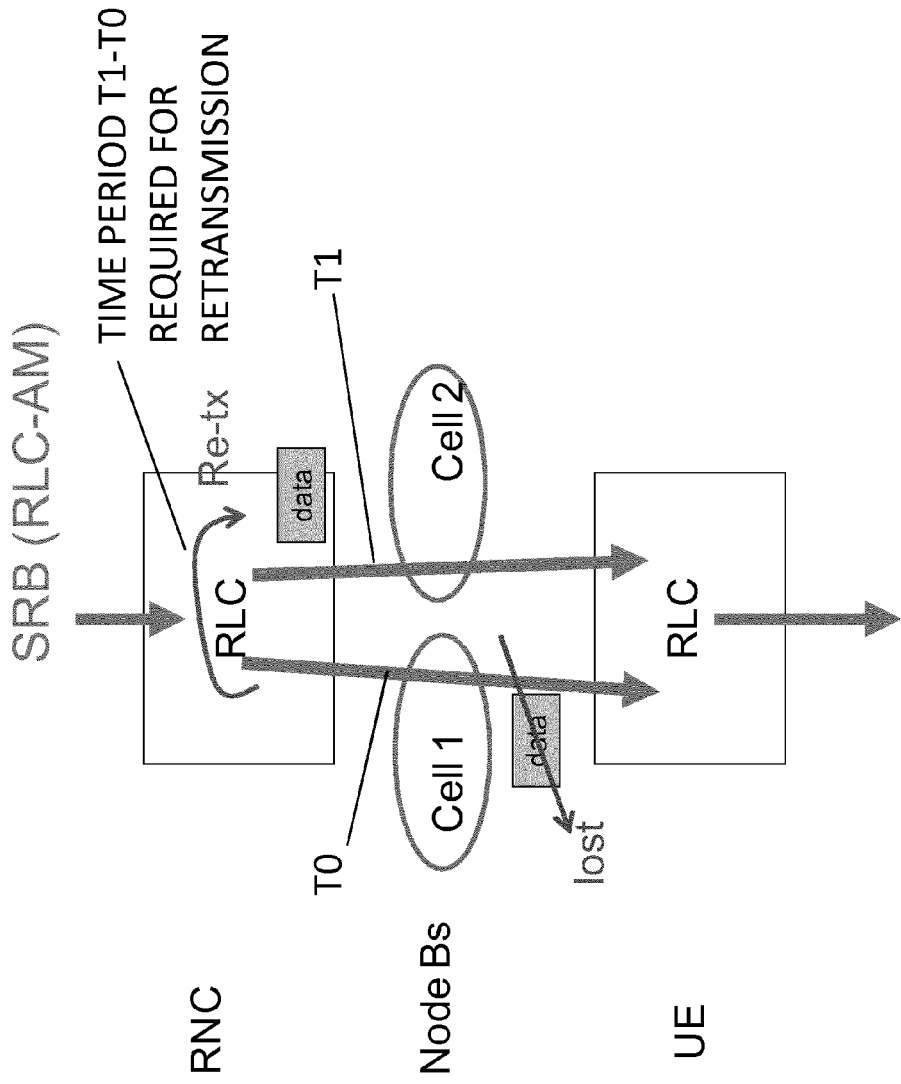
FIG. 3 shows a diagram illustrating an example of a signaling flow in a multiflow connection of elements shown in FIG. 1.

With regard to FIG. 3, an example for a data transmission scheme using multiflow applied to the SRB is shown with elements depicted in FIG. 1 (for example RNC 20, NBs 10 and 15 and UE 35). Specifically, FIG. 3 shows an example of applying multiflow to the SRB wherein by virtue of using the ability to retransmission (re-tx) on a second link robustness is increased.

According to the example shown in FIG. 3, when multiflow connection is established, SRB (with RLC-AM) is sent from RNC 20 at first at time T0 via cell1 (i.e. NB 10) to the RLC function of e.g. UE 35. However, the data transmission is lost. When data loss is detected (e.g. due to missing ACK from UE 35), RNC 20 starts retransmission at time T1 over a second path of the multiflow connection (e.g. via cell 2 of NB 15). That is, a time period T1-T0 is required before the data can be resent and thus received at the UE 35. It is to be noted that the retransmission may be executed also via another path which can be selected by the RNC 20 independently, for example also again via cell 1. A selection criterion may be based on a radio link reliability measure (described later) allowing the RNC 20 to estimate which path is proper for the data transmission.

It is to be noted that multiflow and bicasting is related to macrodiversity combining. That is, in UL macrodiversity as in inter-site UL SHO the receive antennas and first signal preprocessors are in different locations, and the signals or processed signals will be relayed to the RNC which is performing the final diversity combining. In DL, MBMS specifies "selection combining" (see e.g. TS 25.346 v7.2.0 section 7.3.5). The difference to MF is stemming largely from the different design purposes. For instance Multiflow allows UE-specific transmissions.

According to further examples, it is also possible to increase robustness at the cell edge by carrying the SRB on e.g. the non-HSDPA Rel99 DCH, where normal SHO is supported. However, in this case, lower capacity (usage of code-space) is provided, while features as CPC and F-DPCH can not be used.

According to a further example, it is also possible to deal with the robustness at the cell-edge by using the eSCC, where a new link is preconfigured at the UE and a new cell can directly activate the new link without RRC signalling. This solution is however only applicable to exactly one specific message, i.e. RL reconfiguration.

In the following, examples of embodiments to the invention are discussed which are related to provide means for a data transmission scheme with increased robustness where it is intelligently chosen what data are transmitted by using bicasting and/or which path(s) of a multiflow connection is/are to be used.

According to examples of embodiments of the invention, the following processings are considered in a data transmission scheme. First, for transmitting the data, a hybrid bicasting procedure or a (multiflow-) dynamic flow switching procedure is conducted for transmitting (user or control plane) data by using a multiflow connection, such as e.g. HSDPA Multiflow. Second, a new radio link reliability measure is introduced that can be used to decide whether to use normal (multi-stream) Multiflow transmission, bicasting or dynamic flow switching. This reliability measure is configurable, for example in form of content, and in form of reporting events/frequency.

According to examples of embodiments of the invention, the reliability measure can be e.g. an estimate of packet error rate, latency, or signal quality, e.g. in form of UE-specific filtered CQI reports or filtered HARQ ACK/NACK statistics.

In case the decision regarding bicasting or multiflow switching is done in the RNC (i.e. inter-site multiflow processing), according to examples of embodiments of the invention, the reliability measure is provided by NBs to the RNC. On the other hand, when the decision regarding bicasting or multiflow switching is done in the NB (i.e. intra-site multiflow processing), according to examples of embodiments of the invention, the reliability measure is used directly within the NB in question.

In the inter-site multiflow processing, according to examples of embodiments of the invention, the RNC 20 triggers a transmission of the reliability measure by the NB in a selective manner, such that it applies e.g. only for traffic or data types that benefit from the improved robustness (e.g. based on QoS, DPI, or knowledge of the control plane traffic content).

According to examples of embodiments of the invention, the reliability measure is in particular useful in case there is little data being transmitted on one of the two links. Since it is difficult for the RNC 20 to estimate the quality of the link based on conventionally provided data (such as flow control), the reliability measure is configurable in form of content, and in form of reporting events/frequency (i.e. intervals of transmission of information related to the reliability measure).

According to examples of embodiments of the invention, when dynamic flow switching is selected for data transmission, the reliability measure is used also to decide over which path or link the data are to be sent.

It is to be noted that according to examples of embodiments of the invention, the reliability measure is common among the NBs. For example, according to examples of embodiments of the invention, the reliability measure is specified as a list of possible measures (such as those mentioned above) that the RNC can configure (for example, similar to measurement reports which can be configured to be of type RSSI or SINR). Alternatively, the reliability measure can be predefined as a compound value of above messages. Furthermore, according to examples of embodiments of the invention, the reliability measure is provided separately for respective traffic or data types, e.g. for the SRB and user plane.

In other words, according to examples of embodiments of the invention, a multiflow connection with (at least) two data paths is established from the network (e.g. the RNC's RLC entity) to the terminal (e.g. the UE's RLC entity). According to a selection criteria, some data are bicasted over more than one path, while other data are sent over one path only, but the path used is selected dynamically for each data unit. The criterion for path selection/bicasting is at least partially based on what is transmitted (data type etc.), and partly on a reliability measures of the two paths.

Thus, according to examples of embodiments of the invention, bicasting can be used for at least some SRB traffic for reliability reasons (increased robustness), while on the other hand multiflow or dynamic path selection is used for (non-critical) data, such as for user data. It is to be noted that the increased robustness provided by bicasting is also usable for user data related to specific services, such as voice or other delay-intolerant services where RLC retransmission cannot be used.

Next, as an example for an implementation of the data transmission scheme according to examples of embodiments of the invention, bicasting of SRB data and dynamic flow switching of other data is described.

That is, for transmitting SRB data, bicasting via multiflow connection is selected. Specifically, in order to achieve higher reliability multiflow is applied to a selected SRB, e.g. SRB2, wherein the SRB data are bicasted on the (at least) two multiflow links. In contrast to a traditional HSDPA bicasting, the UE is continuously receiving on both links due to the multiflow connection. The advantage is that the reliability for messages is increased. This is especially important for messages relating to link changes and mobility.

It is to be noted that according to examples of embodiments of the invention, the UE (e.g. UE 30, UE 35) is configured to handle duplicate RLC messages (as is already defined for RLC-AM). According to examples of embodiments of the invention, for RLC-ACK handling at UE and RNC, the UE is configured to send an ACK only for the first of two identical RLC PDUs. Alternatively, in case the UE is configured to acknowledge both RLC PDUs, the RNC is configured to discard one of the ACKs.

It is to be noted that since the UE is in SHO mode, the RLC ACK can be assumed to safely arrive at the RNC.

According to further examples of embodiments of the invention, bicasting is applied only to a subset of the messages sent e.g. over the SRB2. For example, non-time critical messages are not subjected to bicasting but to either multiflow transmission or dynamic flow switching (using e.g. the reliability measure), i.e. they are always sent over a predefined link or over the link that is selected by reliability or flow control criteria.

By means of the above described measures according to examples of embodiments of the invention, using bicasting can improve the reliability, especially during link changes. All bicasted data are available at the UE in parallel. In particular, according to examples of embodiments of the invention, HS-DSCH for the SRB is available while maintaining high robustness.

Figure 4:
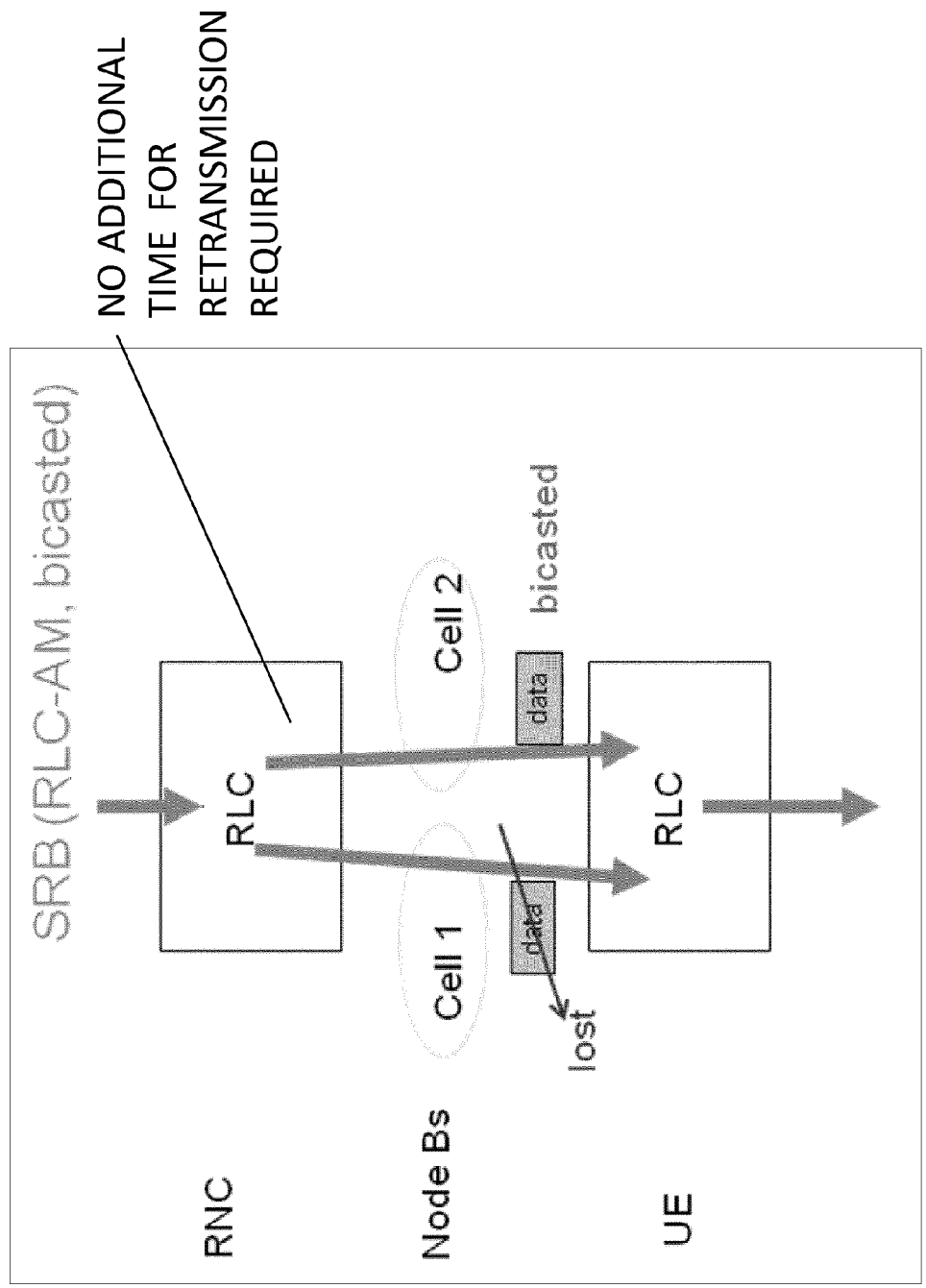
FIG. 4 shows a diagram illustrating an example of a signaling flow in a bicasting procedure of elements shown in FIG. 1 according to examples of embodiments of the invention.

FIG. 4 shows a diagram illustrating an example of a signaling flow in a bicasting procedure of elements shown in FIG. 1 according to examples of embodiments of the invention. In particular, FIG. 4 illustrates the effect of applying bicasting and multiflow to a case comparable to that shown in FIG. 3.

Similar to FIG. 3, according to FIG. 4, a data transmission scheme using multiflow applied to the SRB is shown with elements depicted in FIG. 1 (for example RNC 20, NBs 10 and 15 and UE 35), wherein an inter-site multiflow case is assumed. Specifically, FIG. 4 shows an example of applying multiflow and bicasting to the SRB wherein by virtue of using bicasting on a second link robustness is increased.

According to the example shown in FIG. 4, when multiflow convection is established, SRB (with RLC-AM) is sent from RNC 20 at time T0 via cell1 (i.e. NB 10) to the RLC function of e.g. UE 35, and in parallel by using bicasting at time T0 via cell2 (i.e. NB 15) to the RLC function of UE 35. Hence, even if the data transmission is lost on e.g. the path via cell1, by the transmission at time T0 over a second path of the multiflow connection (e.g. via cell 2 of NB 15), there is no time delay for receiving the data, while at the same time robustness is increased.

Figure 5:
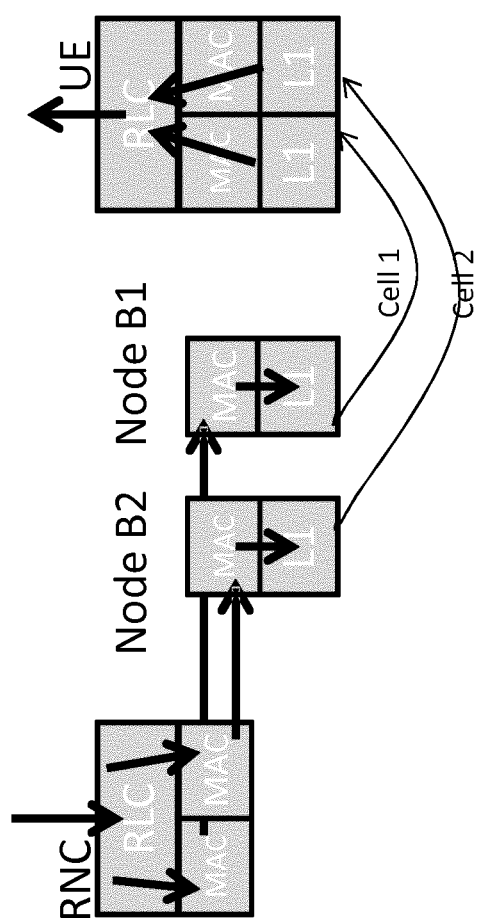
FIG. 5 shows a diagram illustrating details of the signaling flow in the bicasting procedure of elements as shown in FIG. 4 according to examples of embodiments of the invention.

FIG. 5 shows a diagram illustrating details of the signaling flow in the bicasting procedure of elements as shown in FIG. 4 according to examples of embodiments of the invention, i.e. details with regard to the processing related to the inter-site multiflow case. As described in connection with FIG. 4, in the bicasting processing, the RNC duplicates the data in the RLC layer of the RNC, and the RNC MAC layer sends the two instances of the data to the two NBs (i.e. their MAC layers). The NBs (e.g. NB1 10 and NB2 15) send the respective data in parallel via two Layer 1 connections to the UE. The UE (e.g. UE 35) processes on its physical and MAC layers the received data (packets) independently and the UE's RLC sees two instances of the same RLC PDU which are then processed accordingly.

It is to be noted that in case a packet is not subjected to bicasting processing, then the RNC RLC selects one of the two paths for each PDU according to dynamic flow switching processing, for example.

Figure 6:
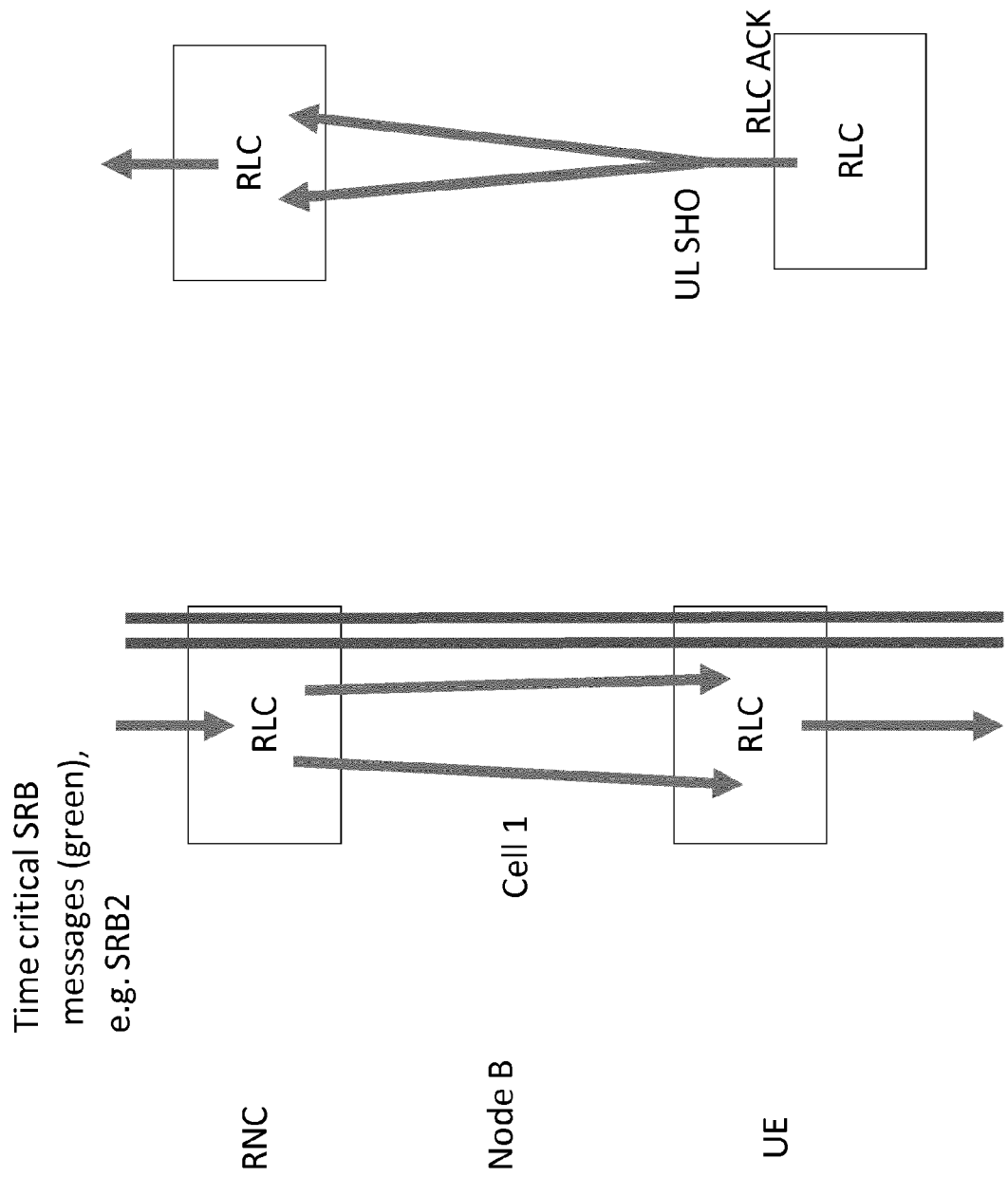
FIG. 6 shows a diagram illustrating an example of a signaling flow in a bicasting procedure of elements shown in FIG. 1 according to further examples of embodiments of the invention.

FIG. 6 shows a diagram illustrating an example of a signaling flow in a bicasting procedure of elements shown in FIG. 1 according to further examples of embodiments of the invention.

FIG. 6 shows a diagram illustrating an example of a signaling flow in a bicasting procedure of elements shown in FIG. 1 according to examples of embodiments of the invention. According to FIG. 6, different to FIG. 4, a data transmission scheme using multiflow applied to the SRB is shown with elements depicted in FIG. 1 (for example RNC 20, NB 10 and UE 30), wherein an intra-site multiflow case is assumed. Specifically, FIG. 6 shows an example of applying multiflow and bicasting to the SRB wherein by virtue of using bicasting on a second link robustness is increased.

According to the example shown in FIG. 6, when a multiflow connection is established in DL, time critical SRB data are sent from RNC via cell1 (i.e. NB 10) to the RLC function of e.g. UE 30, and in parallel by using bicasting via a second path to the RLC function of UE 30. That is, as shown in FIG. 6 the RLC duplicates time critical SRB messages (e.g., Serving Cell Change) and sends it over two different radio links/cells. Hence, even if the data transmission is lost or delayed on the first path via cell1, by the transmission via a second path of the multiflow connection, the data are received, so that robustness is increased.

As indicated further in FIG. 6, other data (e.g. other SRB data) are sent over a single link (indicated by the two solid lines). These flows (or data) are not duplicated, but each blue flow is sent over the air only once (by using e.g. dynamic flow switching based on the reliability measure or some other criteria), i.e. the RNC or NB is in control over which cell each flow is sent.

In UL direction, as shown on the right side of FIG. 6, procedures as in a usual SHO procedure applies, also for the RLC ACK messages.

Figure 7:
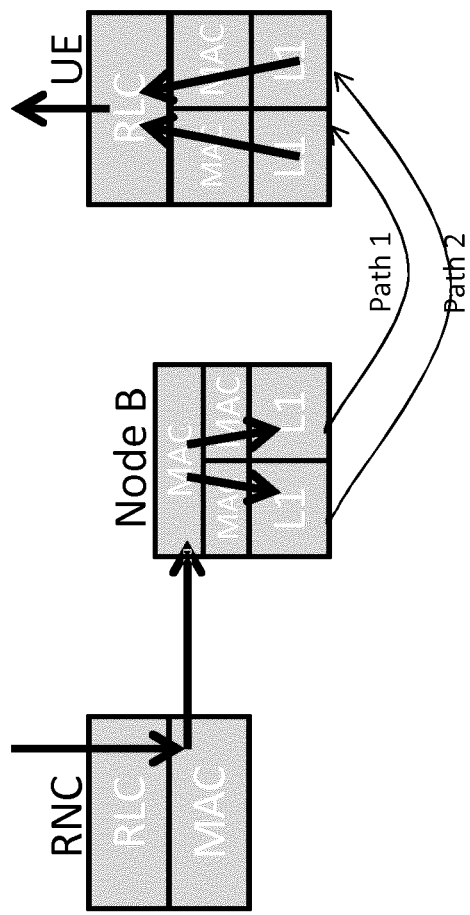
FIG. 7 shows a diagram illustrating details of the signaling flow in the bicasting procedure of elements as shown in FIG. 6 according to further examples of embodiments of the invention.

FIG. 7 shows a diagram illustrating details of the signaling flow in the bicasting procedure according to further examples of embodiments of the invention, i.e. details with regard to the processing related to the intra-site multiflow case. As described, in the bicasting processing, the RNC or the NB (in FIG. 7 it is the NB) duplicates the data in the MAC layer and sends the two instances of the data via two physical layers of e.g. two cells (two Layer 1 paths) to the UE. The UE (e.g. UE 30) processes on its physical and MAC layers the received data (packets) independently and the UE's RLC sees two instances of the same RLC PDU which are then processed accordingly.

That is, according to examples of embodiments of the invention, in the intra-site multiflow processing, two links over two cells that may reside in the same base station are set up. The most common WCDMA/HSPA base station configuration is such that there are three cells (three sectors) in one carrier frequency that one base station controls. On the other hand, in the intra-site multiflow case, there is one RLC-to-RLC connection between the RNC and the UE and just one data path from the RNC to the NB. The NB makes the path switching or bicasting decision in the MAC layer.

That is, when a packet is not subjected to bicasting, then the NB MAC selects one of the two paths for each PDU.

Figure 8:
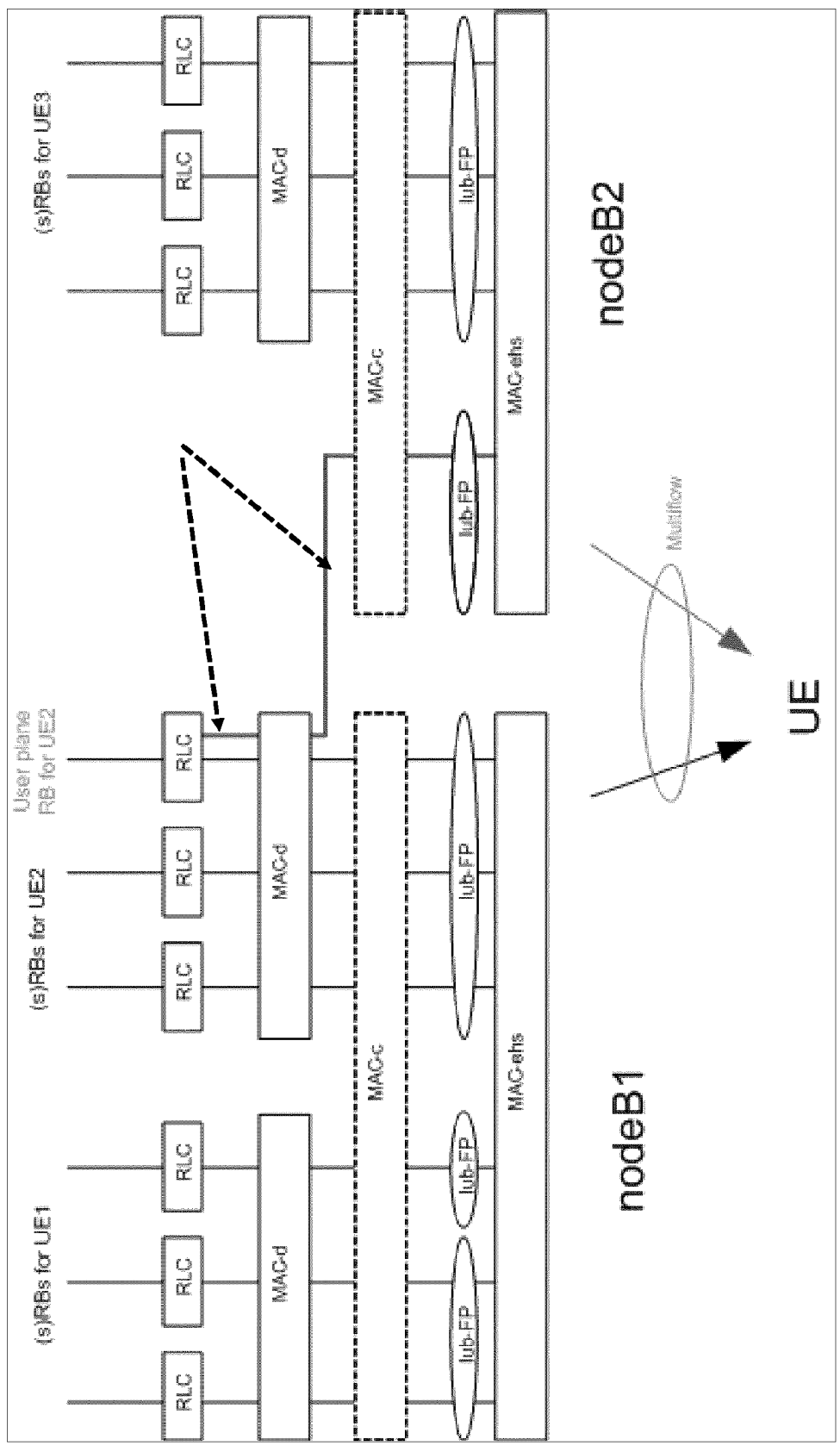
FIG. 8 shows a diagram illustrating multiplexing and protocol architecture for MAC-ehs according to an example of embodiments of the invention.

FIG. 8 shows a diagram illustrating multiplexing and protocol architecture for MAC-ehs based on the specifications given by 3GPP TS 25.308 (see FIG. 6.2.1-3 and related description therein) according to an example of embodiments of the invention. As indicated in FIG. 8 by dashed arrows, by the bicasting of data flows, additional links are established, e.g. for user plane for UE2, towards the NB2. The UE is configured for supporting handling of two separate multiflow connections from NB1 and NB2.

Figure 9:
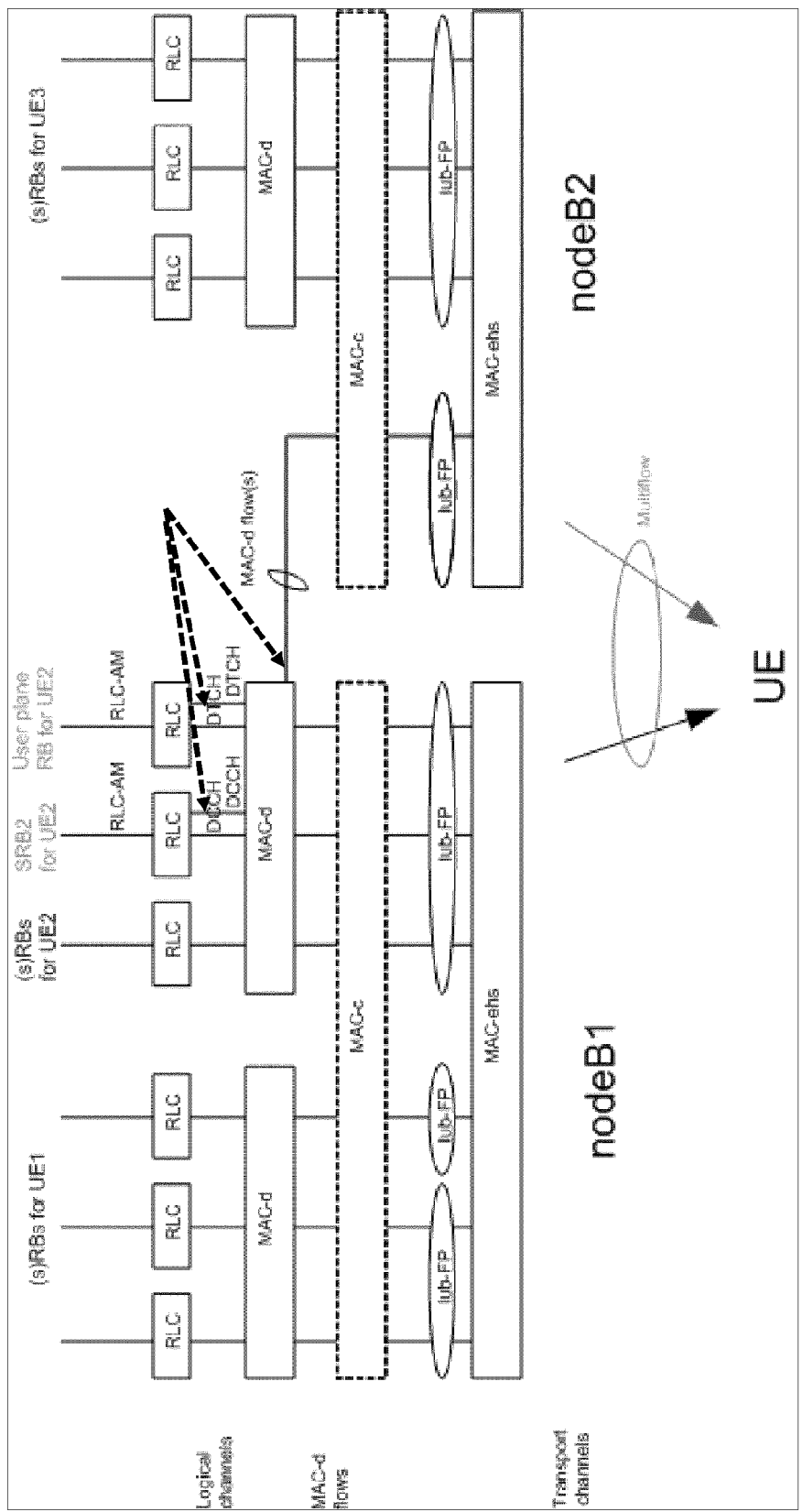
FIG. 9 shows a diagram illustrating multiplexing and protocol architecture for MAC-ehs according to another example of embodiments of the invention.

FIG. 9 shows a diagram illustrating multiplexing and protocol architecture for MAC-ehs based on the specifications given by 3GPP TS 25.308 (see FIG. 6.2.1-3 and related description therein) according to an example of embodiments of the invention. As indicated in FIG. 9 by dashed arrows, as in the case of FIG. 8, by the bicasting of data flows, additional links are established, e.g. for user plane for UE2, towards the NB2. Furthermore, in addition to the measures according to FIG. 8, in FIG. 9, multiflow is also applied to e.g. SRB2 for UE2. The UE is also configured for supporting handling of two separate multiflow connections from NB1 and NB2.

Figure 10:
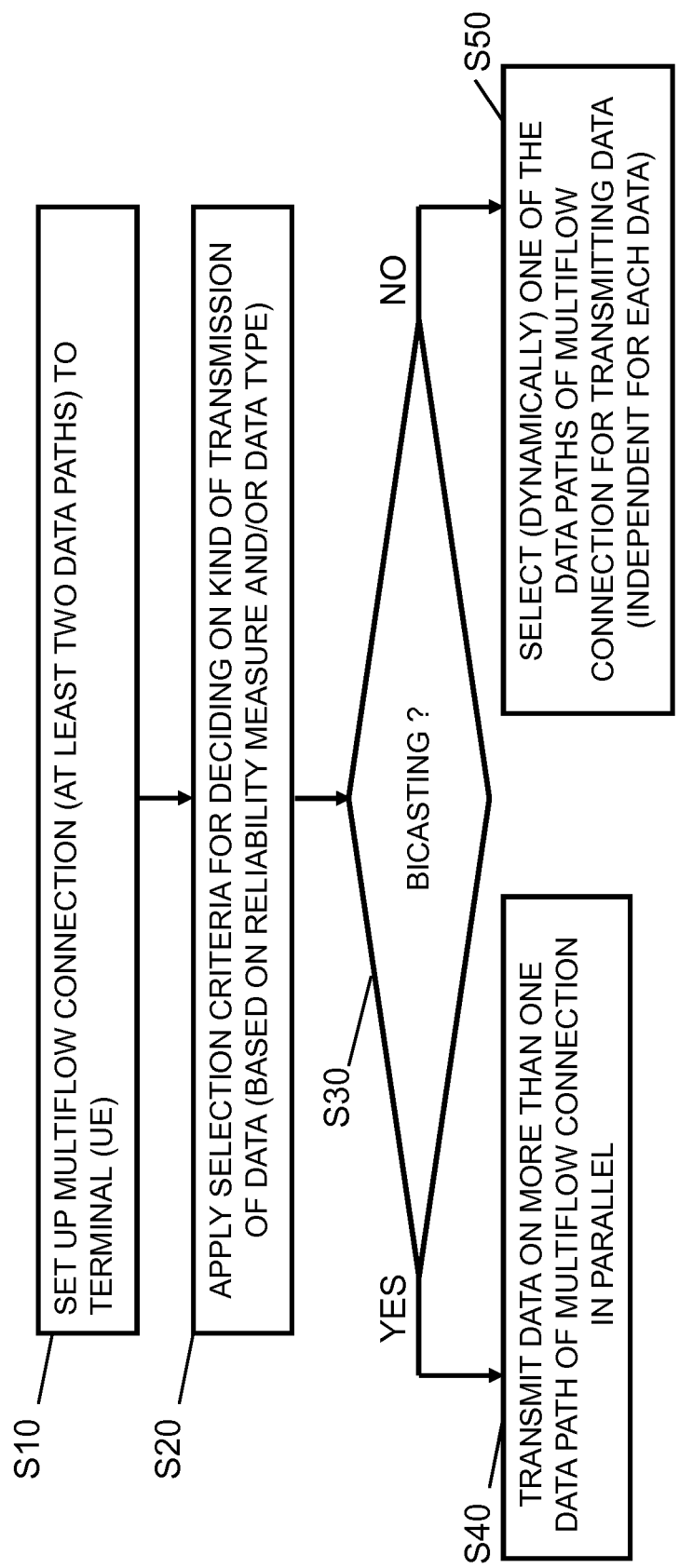
FIG. 10 shows a flowchart illustrating a processing executed in a network management entity or communication network control element according to examples of embodiments of the invention.

FIG. 10 shows a flowchart illustrating a processing executed in a network management entity or communication network control element like the RNC 20 (or a NB such as NB 10 in case of an intra-site multiflow procedure) according to FIG. 1 according to examples of embodiments of the invention in a data transmission.

In step S10, a multiflow connection (comprising at least two different paths) for data units to be transmitted from a network to a terminal (UE) is set up via at least one network transceiver device. The network transceiver device is, for example, the NB 10 or 15, wherein in case of an intra-site multiflow scenario the multiflow connection is set up also by the NB as well (in contrast to the inter-site multiflow scenario where the multiflow connection is set up by the RNC 20 with the NB 10 or 15 acting only as "relay").

According to examples of embodiments of the invention, data units are for example of a control plane data type or of a user plane data type. Furthermore, according to examples of embodiments of the invention, the paths are set up as distinct logical channels, wherein the distinct logical channels may be set up on distinct physical channels.

In step S20, a selection criteria is applied for determining in which way the data units are transmitted. According to examples of embodiments of the invention, the selection criteria is based on a radio link reliability measure and/or on the type of the data unit to be transmitted and/or the content of the data unit to be transmitted.

According to examples of embodiments of the invention, the selection criteria is based on a radio link reliability measure indicative of the radio link reliability towards the terminal (air interface, for example). Specifically, the radio link reliability measure comprises at least one of an estimate of a packet error rate, a latency, or a signal quality. Alternatively or additionally, according to examples of embodiments of the invention, the selection criteria are configured to be distinct for different data types. That is, depending on the data type of the data unit to be transmitted (e.g. time critical control data, non-critical user data etc.), the type of transmission (bicasting, dynamic flow switching) is selected.

According to examples of embodiments of the invention, at least some of the selection criteria (in particular with regard to the radio link reliability measure) is received as reports from a terminal (UE). Alternatively or additionally, at least some of the selection criteria is obtained on the basis of an own statistic evaluation (e.g. conducted in the NB or RNC).

Furthermore, according to examples of embodiments of the invention, the selection criteria are received upon request from the network transceiver device (NB 10 or 15), wherein the selection criteria may be requested from the network transceiver device selectively for at least specified data types and/or specified traffic types (i.e., for example, radio link reliability measure is only requested for those data types or traffic types which may be used for bicasting or the like). Moreover, according to examples of embodiments of the invention, the selection criteria is requested with a configurable request interval and/or based on the detected occurrence of configurable reporting events.

On the basis of the selection criteria applied in step S20, in step S30, it is decided whether the data unit in question is sent by using bicasting or not (i.e. by using dynamic flow switching over one of the multiflow connection's paths).

If the decision in step S30 is affirmative, i.e. bicasting is decided to be used for the data transmission by evaluating the selection criteria, step S40 is conducted where the data unit in question is sent to the terminal via the multiflow connection by using at least two of the paths to the terminal for sending the (same) data unit in parallel.

Otherwise, in case the decision in step S30 is negative, step S50 is conducted. In step S50, the data unit in question is not sent by bicasting but by using a dynamic flow switching. In other words, the data unit is transmitted by using one of the at least two paths. According to examples of embodiments of the invention each data unit selected to be transmitted by dynamic flow switching is independently transmitted over either of the at least two paths. For choosing the proper path, according to examples of embodiments of the invention, the selection criteria, in particular the radio link reliability measure, is used. Alternatively, a preset path is used for transmission.

Figure 11:
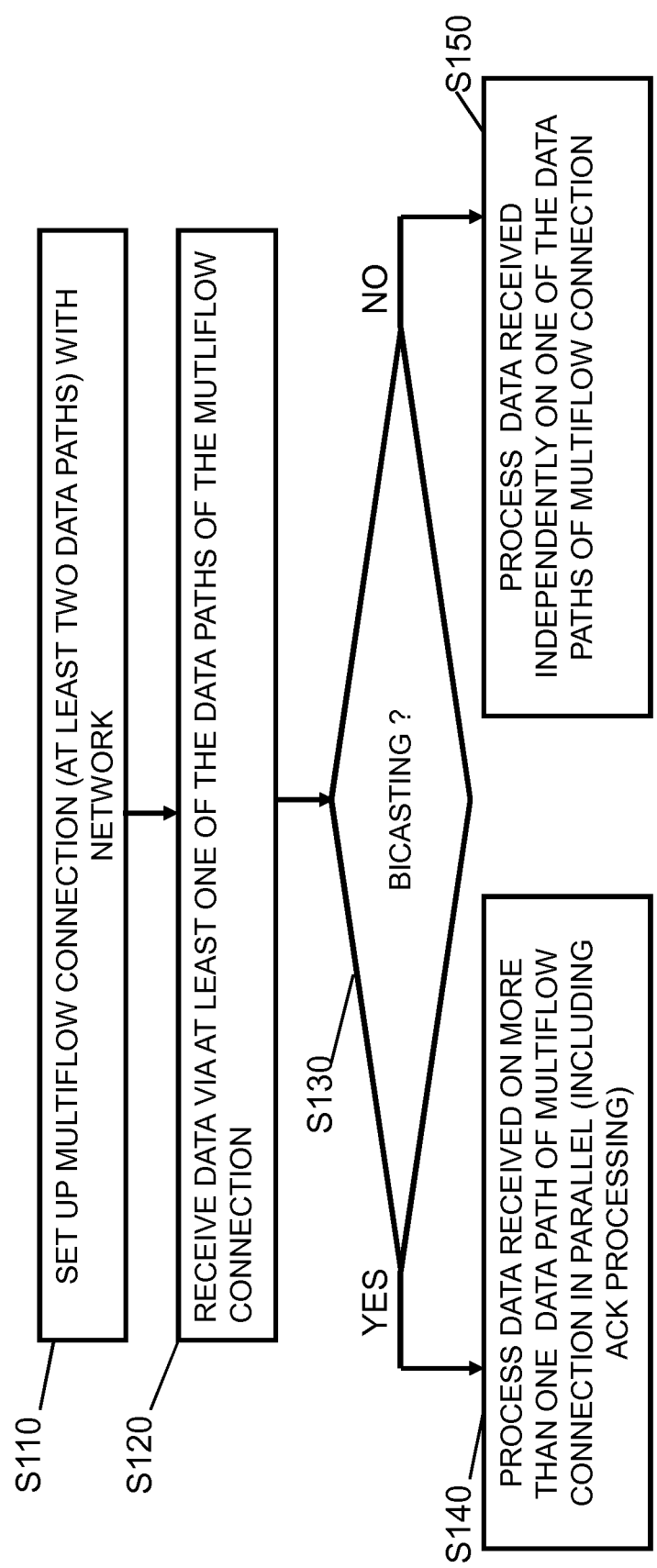
FIG. 11 shows a flowchart illustrating a processing executed in a terminal or communication element according to examples of embodiments of the invention.

FIG. 11 shows a flowchart illustrating a processing executed in a communication element or terminal like the UE 30 or 35 according to FIG. 1 according to examples of embodiments of the invention in a data transmission.

In step S110, a multiflow connection (comprising at least two different paths) for data units to be transmitted from a network to the terminal (UE) is set up via at least one network transceiver device. The network transceiver device is, for example, the NB 10 or 15.

According to examples of embodiments of the invention, data units are for example of a control plane data type or of a user plane data type. Furthermore, according to examples of embodiments of the invention, the paths are set up as distinct logical channels, wherein the distinct logical channels may be set up on distinct physical channels.

In step S120, a data unit is received via at least one of the data paths of the multiflow connection.

In step S130, it is determined whether the received data unit was sent by using bicasting or by using dynamic flow switching over one of the multiflow connection's paths.

If the decision in step S130 is affirmative, i.e. bicasting is decided as being used for the data transmission, step S140 is conducted where the data unit received by two (or more) paths via the multiflow connection is processed (i.e. only one of the two or more same data units is used for processing), wherein also an acknowledgment processing may be included (i.e. only one of the two data unit receipts is acknowledged while the other is ignored even though also received).

Otherwise, in case the decision in step S130 is negative, step S150 is conducted. In step S50, the data unit received by only one path via the multiflow connection is processed.

Even though not depicted in FIG. 11, the processing at the terminal comprises, according to examples of embodiments of the invention, a transmission of selection criteria or information usable as selection criteria to the network management entity controlling the selection of the data units to be transmitted via the multiflow connection by using bicasting or dynamic flow switching. For example, according to examples of embodiments of the invention, the UE sends upon receiving a request reports usable as for the selection criteria to the network management entity (the NB 10 or the RNC 20, for example). According to examples of embodiments of the invention, the selection criteria or report comprises a radio link reliability measure indicative of the radio link reliability experiences by the terminal (air interface, for example). Specifically, the radio link reliability measure comprises at least one of an estimate of a packet error rate, a latency, or a signal quality. Alternatively or additionally, according to examples of embodiments of the invention, the selection criteria may be requested selectively for at least specified data types and/or specified traffic types (i.e., for example, radio link reliability measure is only requested for those data types or traffic types which may be used for bicasting or the like). Moreover, according to examples of embodiments of the invention, the selection criteria is transmitted with a configurable interval and/or in response to a request based on occurrence of configurable reporting events.

Figure 12:
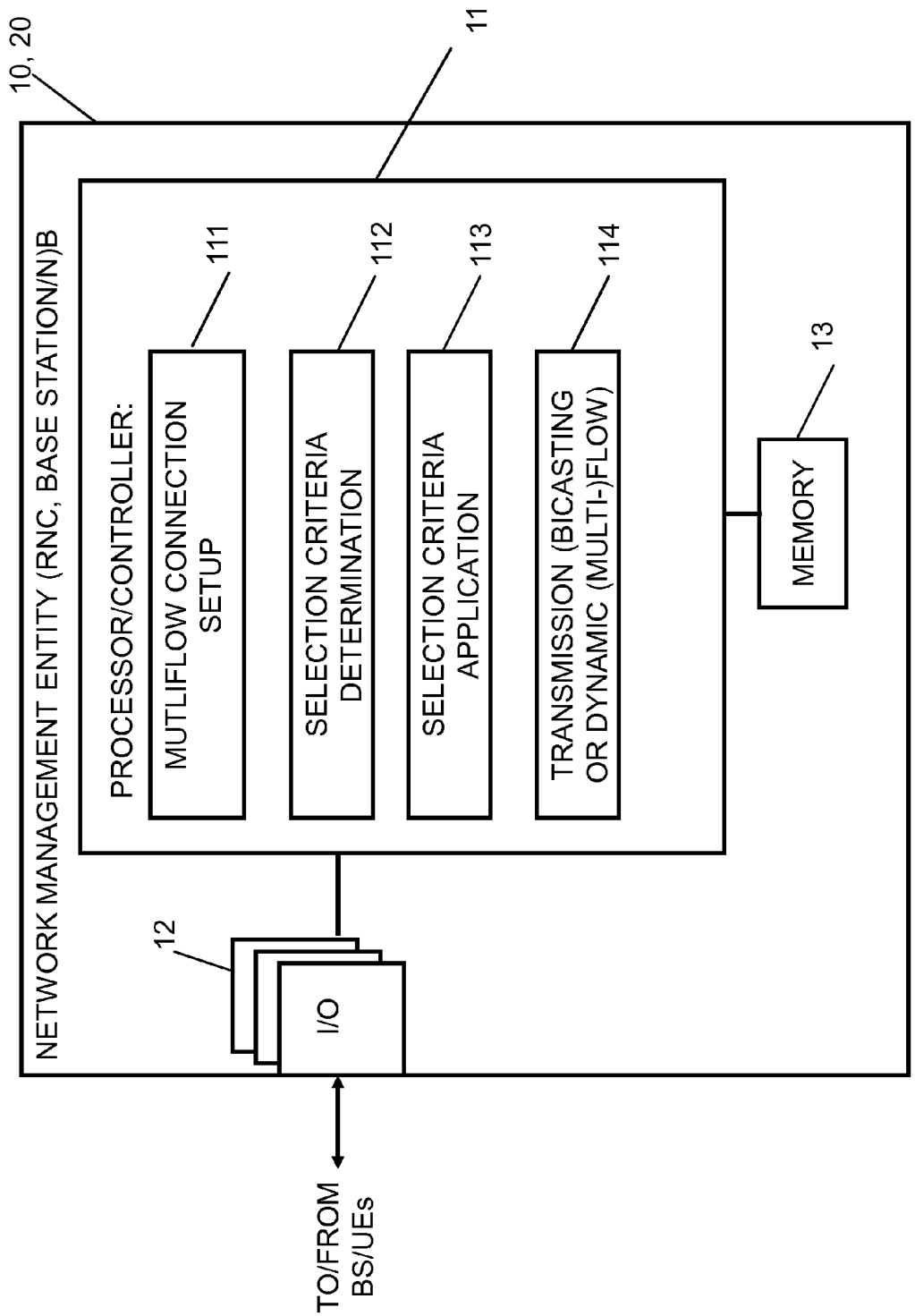
FIG. 12 shows a block circuit diagram of a network management entity or communication network control element including processing portions conducting functions according to examples of embodiments of the invention.

In FIG. 12, a block circuit diagram illustrating a configuration of a network management entity or communication network control element, such as of NB 10 or RNC 20, is shown, which is configured to implement the processing for providing the data transmission as described in connection with the examples of embodiments of the invention. It is to be noted that the communication network control element or network management entity (RNC 20 or NB 10) shown in FIG. 6 may comprise several further elements or functions besides those described herein below, which are omitted herein for the sake of simplicity as they are not essential for understanding the invention. Furthermore, even though reference is made to an RNC or NB, the communication network control element or network management entity may be also another device having a similar function, such as a modem chipset, a chip, a module etc., which can also be part of a control element, RNC or NB or attached as a separate element to an RNC, NB, or the like.

The communication network control element or network management entity may comprise a processing function or processor 11, such as a CPU or the like, which executes instructions given by programs or the like related to the data transmission mechanism. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denote transceiver or input/output (I/O) units (interfaces) connected to the processor 11. The I/O units 12 may be used for communicating with a communication element like a terminal or UE, or for communicating with a network element (such as the RNC in case of intra-site multiflow processing where the NB functions as the network management entity). The I/O unit 12 may be a combined unit comprising communication equipment towards several network elements, or may comprise a distributed structure with a plurality of different interfaces for different network elements. Reference sign 13 denotes a memory usable, for example, for storing data and programs to be executed by the processor 11 and/or as a working storage of the processor 11.

The processor 11 is configured to execute processing related to the above described data transmission mechanism. In particular, the processor 11 comprises a sub-portion 111 as a processing portion which is usable for setting up the multiflow connection. The portion 111 may be configured to perform processing according to step S10 of FIG. 10, for example. Furthermore, the processor 11 comprises a sub-portion 112 usable as a portion for determining selection criteria (e.g. based on reports from the terminal like radio link reliability etc.). In addition, the processor 11 comprises a sub-portion 113 as a processing portion which is usable for applying the selection criteria. The portion 113 may be configured to perform processing according to steps S20 and S30 of FIG. 10, for example. Furthermore, the processor 11 comprises a sub-portion 114 usable as a transmission portion for setting the transmission mode for the data unit to either bicasting or dynamic flow switching. The portion 114 may be configured to perform processing according to steps S40 and S50 of FIG. 10, for example.

Figure 13:
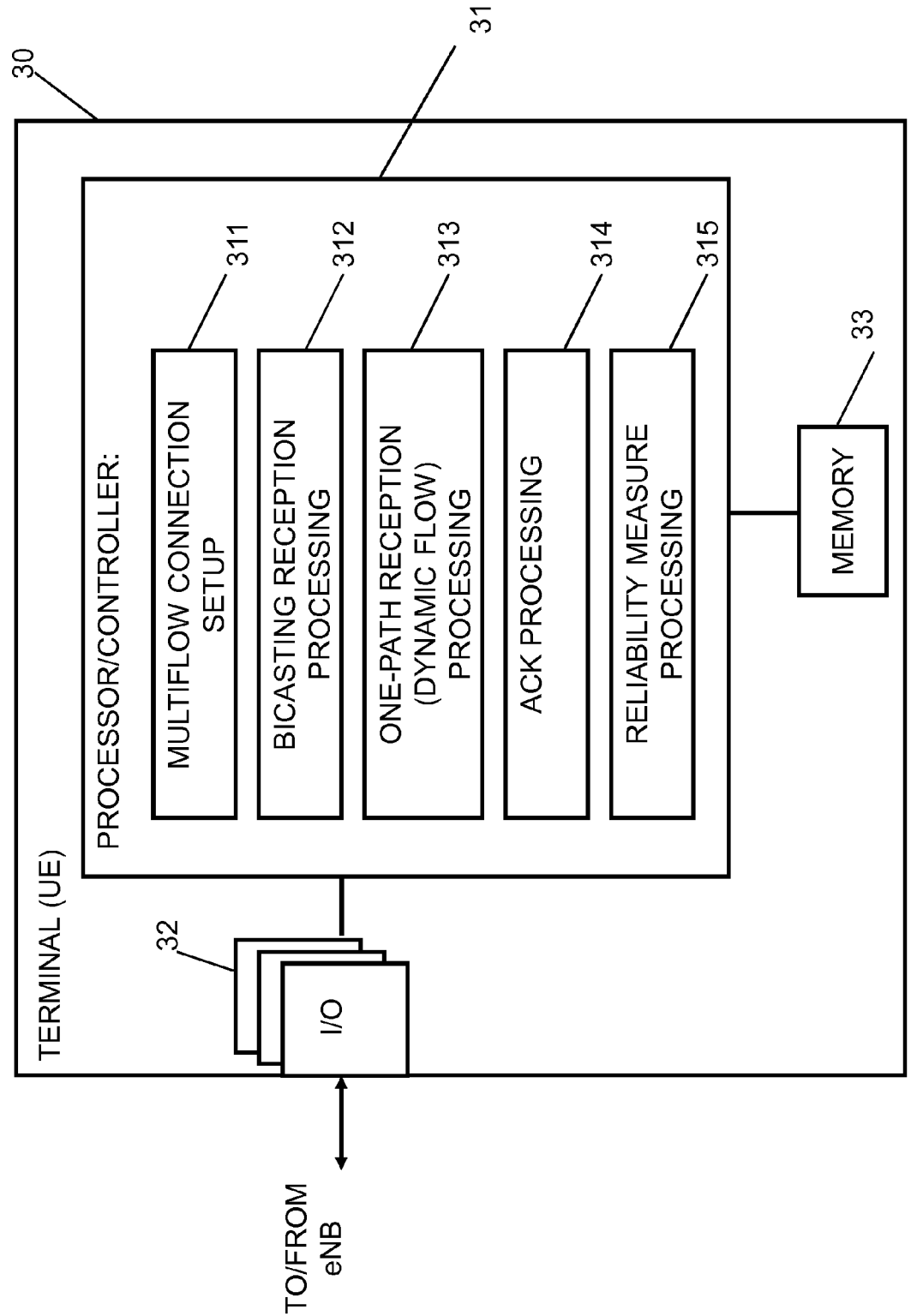
FIG. 13 shows a block circuit diagram of a communication network element including processing portions conducting functions according to examples of embodiments of the invention.

In FIG. 13, a block circuit diagram illustrating a configuration of a communication element or terminal, such as of UE 30 shown in FIG. 1, is shown, which is configured to implement the processing for data transmission as described in connection with the examples of embodiments of the invention. It is to be noted that the communication element or UE 30 shown in FIG. 13 may comprise several further elements or functions besides those described herein below, which are omitted herein for the sake of simplicity as they are not essential for understanding the invention. Furthermore, even though reference is made to a UE, the communication element or terminal may be also another device having a similar function, such as a modem chipset, a chip, a module etc., which can also be part of a UE or attached as a separate element to a UE, or the like.

The communication element or UE 30 may comprise a processing function or processor 31, such as a CPU or the like, which executes instructions given by programs or the like related to the above described data transmission mechanism. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 32 denotes transceiver or input/output (I/O) units or interfaces connected to the processor 31. The I/O units 32 may be used for communicating with elements of the access network, such as a communication network control element like an NB. The I/O units 32 may be a combined unit comprising communication equipment towards several of the network element in question, or may comprise a distributed structure with a plurality of different interfaces for each network element in question. Reference sign 33 denotes a memory usable, for example, for storing data and programs to be executed by the processor 31 and/or as a working storage of the processor 31.

The processor 31 is configured to execute processing related to the above described data transmission mechanism, for example. In particular, the processor 31 comprises a sub-portion 311 as a processing portion which is usable for setting up a multiflow connection. The portion 311 may be configured to perform processing according to step S110 according to FIG. 11, for example. Furthermore, the processor 31 comprises a sub-portion 312 as a processing portion which is usable as a portion for processing received data transmitted by using bicasting. The portion 312 may be configured to perform a processing according to steps S130 and S140 according to FIG. 11, for example. Moreover, the processor 31 comprises a sub-portion 313 as a processing portion which is usable as a portion for processing received data transmitted by using dynamic flow switching. The portion 313 may be configured to perform processing according to steps S130 and S150 according to FIG. 11, for example. In addition, the processor 31 may comprise a sub-portion 314 as a processing portion which is usable as a portion for conducting an acknowledgment processing, e.g. in connection with the processing of received data transmitted by using bicasting. The portion 314 may be configured to perform a processing according to a part of step S140 according to FIG. 11, for example. Furthermore, the processor 31 may comprise a sub-portion 315 as a processing portion which is usable as a portion for conducting processing related to the reliability measure, in particular the reporting of corresponding information.

According to examples of embodiments of the invention, a transmission mechanism is provided which is related to the following.

Examples of embodiments are related to multiflow transmission for HSPA. Specifically, it has been found out that benefits of MF are not only those of bringing throughput gains for cell-edge users, but also that the robustness of SRBs over HS-DSCH can be improved to the level of an SRB over DCH. This is significant, as the HS-DSCH has a number of advantages compared to the DCH, but robustness issues had not been addressed earlier.

A scenario with SRBs using RLC-AM and RLC-UMD is considered. Among the group of SRBs specified in e.g 3GPP specification TS 25.331 (section 6.3), several are using RLC-UMD and RLC-AM. The different SRBs can be briefly summarized as SRB0: CCCH with RLC-TM in UL & RLC-UM in DL (e.g RRCconnectionRequest & Cell/URAupdate in UL & RRCconnectionSetup/Reject in DL)

SRB1: DCCH with RLC-UM (e.g. ciphered CellUpdateConfirm)

SRB2: DCCH with RLC-AM (A majority of the RRC messages is using SRB2)

SRB3: DCCH with RLC-AM (NAS messages=Network Access Stratum messages)

SRB4: DCCH with RLC-AM (optional SRB for low priority NAS messages)

Any of these channels can be transmitted either on the DPCH or on the HS-DSCH transport channel.

Advantages of HS-DSCH and DCH can be summarized as follows. F-DPCH was introduced in Rel.6 in order to free code-resources that would be otherwise used by DCH channels, thus increasing cell capacity by removing code-blocking. The F-DPCH is available only when there are no DCH channels in use. Furthermore, user-specific advanced features such as CPC are not available for the DCH. On the other hand, the DCH provides true DL SHO functionality, helping robustness in cell-edge areas.

Robustness for cell-edge users can be achieved as follows. Regarding robustness in HSDPA, as explained, the HS-DSCH has a number of advantages over the DCH (leading to its popularity), however robustness has not been part of the design from the beginning. This was recognized later on, and for instance the eSCC feature has been specified in the meantime to address the reliability of HS-DSCH connections in cell-edge areas. Also RLC bicasting has been sometimes applied to minimize gaps in hand over situations. In eSCC (enhanced serving cell change), a UE is preconfigured for a new link at an early point in time, and the activation of the new link can happen also from the new cell. Thus, even if the primary link goes down so fast that HO messages can no longer be relayed on it, the connection to the UE can be maintained as the UE will be already listening for activation orders from the new nodeB. The drawback for the eSCC is that it is designed for only one particular function and message (serving cell change). Also, it has not yet found widespread deployment.

RLC bicasting may be used e.g. for VoIP connections, and helps robustness in that it minimizes the gaps in reception during a cell change. Data is bicasted by the RNC to both nodeBs, and while the nodeBs may be also simultaneous transmitting that data, the UE will receive only from one nodeB at any point in time (see also FIG. 2).

For achieving robustness in HSDPA with MF, multiflow is applied to SRB connections. This will enhance the robustness of current solutions, as with MF the UE may be receiving simultaneously from two nodeBs (see also FIG. 3). The robustness is for instance enhanced in RLC-AM, as data that is lost because one link has gone down can be retransmitted over the other link without interrupting the radio bearer.

It is to be noted that an RLC retransmission is a time consuming process, and while helping robustness it may be still disadvantageous for the latencies introduced by the retransmission. Thus, a further improvement is to also apply bicasting to time-critical messages. Then, when a link goes down, or goes down temporarily the message will be still received by the UE on the other link, without delays (see e.g. FIG. 4).

Existing agreed multiflow or RLC-AM bicasting specifications are still applicable. However the UE has to be configured that it is supporting handling of two separate multiflow connections (see e.g. FIGS. 8 and 9).

Hence, applying Multiflow to SRBs using RLC-AM or RLC-UM in CELL_DCH improves robustness. Bicasting to Multiflow on SRBs will further decrease possible latencies, and is not expected to impact capacity in significant manner due to the low traffic volume. Thus, the robustness of high-capacity HS-DSCH connections can reach to the level of low-capacity DCH connections. Thus, as a first approach, Multiflow can be applied to suitable SRBs (that support RLC-AM or RLC-UM), and bicasting can be applied to Multiflow.

According to further examples of embodiments of the invention, there is provided, for example, an apparatus comprising controlling means for setting up a multiflow connection for data units via at least one network transceiver device and via at least two different paths towards a terminal, for applying selection criteria, and, dependent on the applied selection criteria, for selecting data units of specific data, to be subjected to bicasting each selected data unit using the at least two paths, or to dynamic flow switching so as to transmit each selected data unit using one of the at least two paths and wherein each selected data unit can be independently chosen to be transmitted over either of the at least two paths.

In addition, according to further examples of embodiments of the invention, there is provided, for example, an apparatus comprising controlling means for receiving a multiflow connection for data units via at last one network transceiver device and via at least two different paths from a network control entity, and for receiving selected data units of specific data, that were subjected to bicasting, wherein each selected data unit is received using the at least two paths, or subjected to dynamic flow switching, wherein each selected data unit is received using one of the at least two paths and wherein each selected data unit is independently received over either of the at least two paths.

According to further examples of embodiments of the invention, there is provided according to an aspect A, for example, a method comprising setting up a multiflow connection for data units via at least one network transceiver device and via at least two different paths towards a terminal, and applying selection criteria, and dependent on the applied selection criteria, selecting data units of specific data, to be subjected to bicasting each selected data unit using the at least two paths, or to dynamic flow switching so as to transmit each selected data unit using one of the at least two paths and wherein each selected data unit can be independently chosen to be transmitted over either of the at least two paths.

According to further aspect A2, in the method according to aspect A, the data units are of a control plane data type or of a user plane data type.

According to further aspect A3, the method according to aspect A, further comprising setting up the paths up as distinct logical channels.

According to further aspect A4, the method according to aspect A3 further comprises setting up the distinct logical channels on distinct physical channels.

According to further aspect A5, the method according to aspect A further comprises applying, as selection criteria, at least a radio link reliability measure indicative of the radio link reliability towards the terminal.

According to further aspect A6, in the method according to aspect A5, the radio link reliability measure comprises at least one of an estimate of packet error rate, latency, or signal quality.

According to further aspect A7, in the method according to aspect A5 or A6, the selection criteria applied are configured to be distinct for different data types.

According to further aspect A8, the method according to aspect A5, A6 or A7 further comprises receiving at least some of the selection criteria as reports from a terminal and/or to obtain at least some of the selection criteria based on statistic evaluation.

According to further aspect A9, the method according to aspect A8 further comprises requesting the selection criteria from the at least one network transceiver device.

According to further aspect A10, the method according to aspect A9 further comprises requesting the selection criteria from the at least one network transceiver device selectively for at least specified data types and/or specified traffic types.

According to further aspect A11, the method according to aspect A8 further comprises requesting the selection criteria with a configurable request interval and/or based on the detected occurrence of configurable reporting events.

According to further aspect A12, the method according to aspect A further comprises deciding on one of the at least two paths to be used in dynamic flow switching for the selected data unit based on the selection criteria.

According to further examples of embodiments of the invention, there is provided according to an aspect B, for example, a method comprising receiving a multiflow connection for data units via at last one network transceiver device and via at least two different paths from a network control entity, and receiving selected data units of specific data, that were subjected to bicasting, wherein each selected data unit is received using the at least two paths, or subjected to dynamic flow switching, wherein each selected data unit is received using one of the at least two paths and wherein each selected data unit is independently received over either of the at least two paths.

According to further aspect B2, in the method according to aspect B, the data units are of a control plane data type or of a user plane data type.

According to further aspect B3, the method according to aspect B further comprises setting up the paths as distinct logical channels.

According to further aspect B4, the method according to aspect B3 further comprises setting up the distinct logical channels on distinct physical channels.

According to further aspect B5, the method according to aspect B further comprises transmitting at least selection criteria as reports towards a network control entity.

According to further aspect B6, the method according to aspect B5 further comprises transmitting the selection criteria responsive to a request.

According to further aspect B7, the method according to aspect B6 further comprises transmitting the selection criteria, responsive to the corresponding request, selectively for at least specified data types and/or specified traffic types.

According to further aspect B8, the method according to aspect B6 further comprises transmitting the selection criteria responsive to a request received in configurable request intervals and/or responsive to a request received based on an occurrence of configurable reporting events.

According to further aspect B9, in the method according to any of aspects B5 to B8 the selection criteria are at least a radio link reliability measure indicative of the radio link reliability towards the terminal.

According to further aspect B10, in the method according to aspect B9, the radio link reliability measure comprises at least one of an estimate of packet error rate, latency, or signal quality.

According to further examples of embodiments of the invention, there is provided according to an aspect C, for example, an apparatus, comprising a control module configured to receive a multiflow connection for data units via at last one network transceiver device and via at least two different paths from a network control entity, and, receive selected data units of specific data, that were subjected to bicasting, wherein each selected data unit is received using the at least two paths, or subjected to dynamic flow switching, wherein each selected data unit is received using one of the at least two paths and wherein each selected data unit is independently received over either of the at least two paths.

According to further aspect C2, in the apparatus according to aspect C, the data units are of a control plane data type or of a user plane data type.

According to further aspect C3, in the apparatus according to aspect C, the paths are set up as distinct logical channels.

According to further aspect C4, in the apparatus according to aspect C3, the distinct logical channels are set up on distinct physical channels.

According to further aspect C5, in the apparatus according to aspect C, the control module is further configured to transmit at least selection criteria as reports towards a network control entity.

According to further aspect C6, in the apparatus according to aspect C5, the control module is further configured to transmit the selection criteria responsive to a request.

According to further aspect C7, in the apparatus according to aspect C6, the control module is further configured to transmit the selection criteria, responsive to the corresponding request, selectively for at least specified data types and/or specified traffic types.

According to further aspect C8, in the apparatus according to aspect C6, the control module is further configured to transmit the selection criteria responsive to a request received in configurable request intervals and/or responsive to a request received based on an occurrence of configurable reporting events.

According to further aspect C9, in the apparatus according to any of aspects C5 to C8, the selection criteria are at least a radio link reliability measure indicative of the radio link reliability towards the terminal.

According to further aspect C10, in the apparatus according to aspect C9, the radio link reliability measure comprises at least one of an estimate of packet error rate, latency, or signal quality.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (terminal) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for conducting data transmission from a network management entity of communication network control element to a terminal or UE with improved robustness. After a multiflow connection for data units via at least one network transceiver device and via at least two different paths is set up towards a terminal, selection criteria are applied so as to decide which data units are sent on which transmission path. Specifically, dependent on the applied selection criteria, data units of specific data are selected to be subjected either to bicasting each selected data unit using the at least two paths, or to dynamic flow switching so as to transmit each selected data unit using one of the at least two paths and wherein each selected data unit can be independently chosen to be transmitted over either of the at least two paths.

Although the present invention has been described herein before with reference to particular embodiments thereof, the present invention is not limited thereto and various modifications can be made thereto.

The invention claimed is:

1. An apparatus, comprising:
at least one processor; and
at least one memory including computer program code, where the at least one memory and the computer program code are configured, with the at least one processor, to cause the apparatus to at least:
set up a multiflow connection for radio link control data units via at least one network transceiver device and via at least two different paths towards a terminal, and, apply selection criteria; and
dependent on the applied selection criteria, select radio link control data units of specific data, to be subjected at least one of:
to bicasting each selected radio link control data unit using the at least two paths, and
to dynamic flow switching so as to transmit each selected radio link control data unit using one of the at least two paths and wherein each selected radio link control data unit can be independently chosen to be transmitted over either of the at least two paths.

2. The apparatus according to claim 1, wherein the radio link control data units are one of a control plane data type, and of a user plane data type.

3. The apparatus according to claim 1, wherein the at least one memory including the computer program code is configured with the at least one processor to cause the apparatus to set up the paths as distinct logical channels.

4. The apparatus according to claim 3, wherein the at least one memory including the computer program code is configured with the at least one processor to cause the apparatus to set up the distinct logical channels on distinct physical channels.

5. The apparatus according to claim 1, wherein the at least one memory including the computer program code is configured with the at least one processor to cause the apparatus to apply, as selection criteria, at least a radio link reliability measure indicative of the radio link reliability towards the terminal.

6. The apparatus according to claim 5, wherein the radio link reliability measure comprises at least one of an estimate of packet error rate, latency, and a signal quality.

7. The apparatus according to claim 5, wherein the selection criteria applied are configured to be distinct for different data types.

8. The apparatus according to claim 5, wherein the at least one memory including the computer program code is configured with the at least one processor to cause the apparatus to at least one of receive at least some of the selection criteria as reports from a terminal, and obtain at least some of the selection criteria based on statistic evaluation.

9. The apparatus according to claim 8, wherein the at least one memory including the computer program code is configured with the at least one processor to cause the apparatus to request the selection criteria from the at least one network transceiver device.

10. The apparatus according to claim 9, wherein the at least one memory including the computer program code is configured with the at least one processor to cause the apparatus to request the selection criteria from the at least one network transceiver device selectively for at least one of specified data types and specified traffic types.

11. The apparatus according to claim 8, wherein the at least one memory including the computer program code is configured with the at least one processor to cause the apparatus to request the selection criteria with at least one of a configurable request interval, and based on the detected occurrence of configurable reporting events.

12. The apparatus according to claim 1, wherein the at least one processor including the computer configured to
decide on one of the at least two paths to be used in dynamic flow switching for the selected radio link control data unit based on the selection criteria.

13. An apparatus, comprising:
at least one processor; and
at least one memory including computer program code, where the at least one memory and the computer program code are configured, with the at least one processor, to cause the apparatus to at least:
receive a multiflow connection for radio link control data units via at last one network transceiver device and via at least two different paths from a network control entity; and
receive selected radio link control data units of specific data, that were at least one of:
subjected to bicasting, wherein each selected radio link control data unit is received using the at least two paths, and
subjected to dynamic flow switching, wherein each selected radio link control data unit is received using one of the at least two paths, and wherein each selected radio link control data unit is independently received over either of the at least two paths.

14. A method, comprising:
setting up a multiflow connection for radio link control data units via at least one network transceiver device and via at least two different paths towards a terminal;
applying selection criteria; and
dependent on the applied selection criteria, selecting radio link control data units of specific data, to be subjected at least one of:
to bicasting each selected radio link control data unit using the at least two paths, and
to dynamic flow switching so as to transmit each selected radio link control data unit using one of the at least two paths and wherein each selected radio link control data unit can be independently chosen to be transmitted over either of the at least two paths.

15. A computer program product for a computer, comprising a non-transitory computer-readable medium storing software code portions to perform the method of claim 14 when said product is run on the computer.

16. The computer program product according to claim 15, wherein the computer program product is transmittable via a network by at least one of upload, download and push procedures.

17. A method, comprising:
receiving a multiflow connection for radio link control data units via at last one network transceiver device and via at least two different paths from a network control entity; and
receiving selected radio link control data units of specific data, that were at least one of:
subjected to bicasting, wherein each selected radio link control data unit is received using the at least two paths, and
subjected to dynamic flow switching, wherein each selected radio link control data unit is received using one of the at least two paths and wherein each selected radio link control data unit is independently received over either of the at least two paths.

* * * * *